(12) United States Patent
Lee et al.

(10) Patent No.: US 7,092,680 B2
(45) Date of Patent: Aug. 15, 2006

(54) REPLACEABLE SUB-HOUSING AND INTERCHANGEABLE MOBILE TELEPHONE TERMINAL USING THE SAME TO BE USED BOTH AS FLIP-TYPE TERMINAL AND BAR-TYPE TERMINAL

(75) Inventors: Young-Keun Lee, Seoul (KR); Jong-Seok Park, Osan-shi (KR)

(73) Assignee: Samsung Electronics Co., Ltd., (KR)

( * ) Notice: Subject to any disclaimer, the term of this patent is extended or adjusted under 35 U.S.C. 154(b) by 511 days.

(21) Appl. No.: 10/305,583

(22) Filed: Nov. 27, 2002

(65) Prior Publication Data

US 2003/0100276 A1    May 29, 2003

(30) Foreign Application Priority Data

Nov. 27, 2001  (KR)  ................. 2001-74391

(51) Int. Cl.
*H04B 1/38*  (2006.01)
*H04M 1/00*  (2006.01)

(52) U.S. Cl. ................. 455/90.1; 455/90.3; 455/550.1; 455/575.1; 455/575.8

(58) Field of Classification Search ............. 455/90.1, 455/90.3, 550.1, 575.1, 575.3, 575.8, 90.2
See application file for complete search history.

(56) References Cited

U.S. PATENT DOCUMENTS

| | | | |
|---|---|---|---|
| 5,848,152 A | 12/1998 | Slipy et al. | |
| 6,081,595 A | 6/2000 | Picaud | |
| 6,463,262 B1 | 10/2002 | Johnson et al. | |
| 2001/0024945 A1 | 9/2001 | Inomata et al. | |
| 2002/0039890 A1 | 4/2002 | Kim | |
| 2002/0102866 A1 | 8/2002 | Lubowicki | |

FOREIGN PATENT DOCUMENTS

| | | |
|---|---|---|
| EP | 1 028 574 | 8/2000 |
| GB | 2 357 929 | 7/2001 |

*Primary Examiner*—Matthew D. Anderson
*Assistant Examiner*—Eugene Yun
(74) *Attorney, Agent, or Firm*—Dilworth & Barrese LLP

(57) ABSTRACT

Disclosed is a mobile telephone terminal provided with a main housing having an antenna unit, a speaker unit, a LCD, a key array including a plurality of keys, and a microphone unit, and comprising (a) the main housing including a front end and at least one side end, and (b) a replaceable sub-housing including a front end, a first wing and a second wing extended from both side surfaces of the front end in the longitudinal direction, and an accommodation area disposed between the front end and the first and second wings, wherein the replaceable sub-housing surrounds a designated area of the main housing and is attached to and detached from the main housing in the longitudinal direction.

14 Claims, 12 Drawing Sheets

REPLACEABLE SUB-HOUSING AND INTERCHANGEABLE MOBILE TELEPHONE TERMINAL USING THE SAME TO BE USED BOTH AS FLIP-TYPE TERMINAL AND BAR-TYPE TERMINAL

PRIORITY

This application claims priority to an application entitled "EXTERIOR-REPLACEABLE SUB-HOUSING AND FLIP-TYPE/BAR TYPE COMBINATION MOBILE PHONE THEREWITH", filed in the Korean Industrial Property Office on Nov. 27, 2001 and assigned Ser. No. 2001-74391, the contents of which are hereby incorporated by reference.

BACKGROUND OF THE INVENTION

1. Field of the Invention

The present invention relates to a mobile telephone terminal, and more particularly to an interchangeable mobile telephone terminal provided with a replaceable sub-housing, thereby being used as a flip-type terminal and a bar-type terminal.

2. Description of the Related Art

Usually, mobile telephone terminals, also referred to as portable units, communicate with a counterpart mobile terminal via wireless communication with a base station, such as voice communication, picture communication, data transmission, etc. That is, the mobile telephone terminals provide a wireless communication service to users via wireless communication with the base station. These conventional mobile telephone terminals are divided into several types according to their functions, external shapes, and wearing locations.

The mobile telephone terminals may be divided into bar-type terminals, flip-type terminals, and folder-type terminals, according to their shapes. Further, the mobile telephone terminals may be divided into telephone terminals for voice communication, telephone terminals for picture communication, and telephone terminals for Internet communication, according to their functions. Moreover, the mobile telephone terminals may be divided into necklace-type terminals, wristlet-type terminals, etc., according to their wearing locations.

Among the aforementioned various types of mobile telephone terminals, individual configurations of the types of the mobile telephone terminals according to their shapes are described. The bar-type mobile telephone terminal comprises a bar-type housing, a data transmitting and receiving unit, and a data input and output unit. Herein, the data transmitting and receiving unit, and the data input and output unit are installed on the bar-type housing. The flip-type mobile telephone terminal comprises a bar-type housing and a flip. Herein, the flip is connected to the bar-type housing by a hinge unit, thereby being opened from and closed into the bar-type housing. The flip serves to protect a plurality of keys arranged on the bar-type housing and as a sound reflector. The folder-type mobile telephone terminal comprises a main housing, a folder, and a hinge unit for rotatably connecting the folder to the main housing. Further, the folder-type mobile telephone terminal comprises a data transmitting and receiving unit and a data input and output unit, which are installed on designated areas of the folder and the main housing.

The aforementioned bar-type, folder-type, and flip-type mobile telephone terminals are selected in accordance with users' preferences and inclinations. That is, the mobile telephone terminals are selected according to users' age, gender, country, or region. When a user purchases a conventional bar-type mobile telephone terminal, the user has no option but to keep the bar-type mobile telephone terminal and cannot change the external shape of the mobile telephone terminal, thereby causing the user to become bored with the bar-type mobile telephone terminal. As a result, in order to solve this problem, the user needs to additionally purchase a different type of mobile telephone terminal, thereby imposing a heavy economic burden on the user.

SUMMARY OF THE INVENTION

Therefore, the present invention has been made in view of the above problems, and it is an object of the present invention to provide a mobile telephone terminal comprising a replaceable sub-housing, thereby, if desired, being interchangeable to other type terminals such as a flip-type terminal and a bar-type terminal.

It is another object of the present invention to provide a mobile telephone terminal provided with a replaceable sub-housing for satisfying various consumers' tastes.

In accordance with one aspect of the present invention, the above and other objects can be accomplished by the provision of a mobile telephone terminal provided with a main housing having an antenna unit, a speaker unit, a LCD, a key array including a plurality of keys, and a microphone unit, formed on its front surface from the top downward. The mobile telephone terminal comprises (a) the main housing including a front end and at least one side end, and a replaceable sub-housing including a front end, a first wing and a second wing extended from both side surfaces of the front end in the longitudinal direction, and an accommodation area disposed between the front end and the first and second wings, wherein the replaceable sub-housing surrounds a designated area of the main housing and is attached to and detached from the main housing in the longitudinal direction.

In accordance with another aspect of the present invention, there is provided a replaceable sub-housing attached to and detached from a main housing of a mobile telephone terminal in the longitudinal direction, and comprising (a) a front end including at least one opening extended in the longitudinal direction, (b) a first wing and a second wing extended from both side surfaces of the front end in the longitudinal direction, (c) an accommodation area disposed between the front end and the first and second wings, and coupled with a side of the main housing, (d) a first protrusion and a second protrusion extended individually from inner walls of the first and second wings, and (e) a connection protrusion formed on each of the first and second wings and coupled with a designated area of the main housing.

In accordance with yet another aspect of the present invention, there is provided a replaceable sub-housing attached to and detached from a main housing of a mobile telephone terminal in the longitudinal direction, and comprising (a) a front end including at least one opening extended in the longitudinal direction, wherein a designated part of the main housing is inserted into the opening, (b) a hinge housing formed on the front end, (c) a flip element with both ends connected to the hinge housing so as to be opened from and closed into the front end, (d) a first wing and a second wing extended from both side surfaces of the front end in the longitudinal direction, (e) an accommodation area disposed between the front end and the first and second wings, and coupled with a side of the main housing, (f) a first protrusion and a second protrusion extended individually from inner walls of the first and second wings, and (g) a connection protrusion formed on each of the first and second wings and coupled with a designated area of the main housing.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
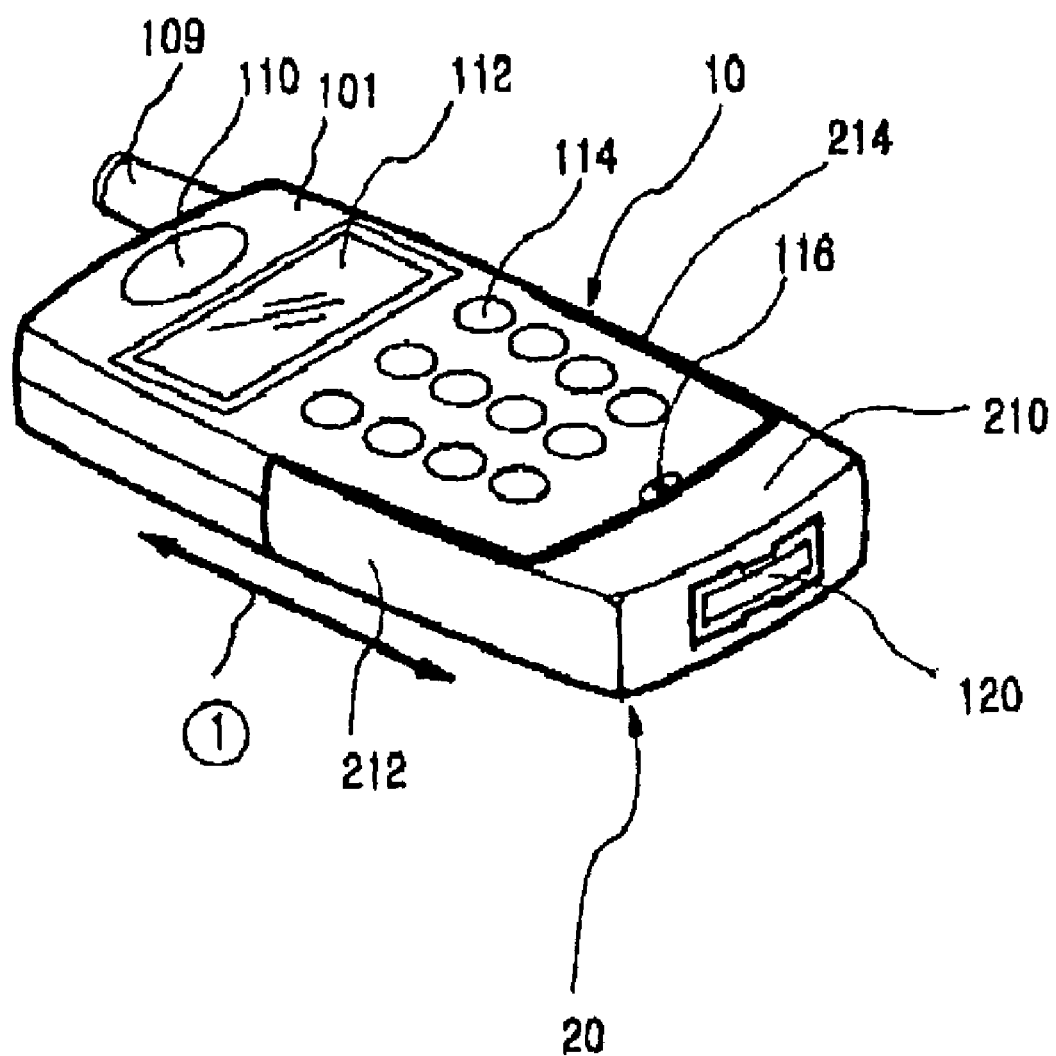
FIG. 1 is a perspective view of a mobile telephone terminal in which a bar-type replaceable sub-housing is coupled with a main housing in accordance with a first preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated is omitted to avoid making the subject matter of the present invention unclear.

Figure 2:
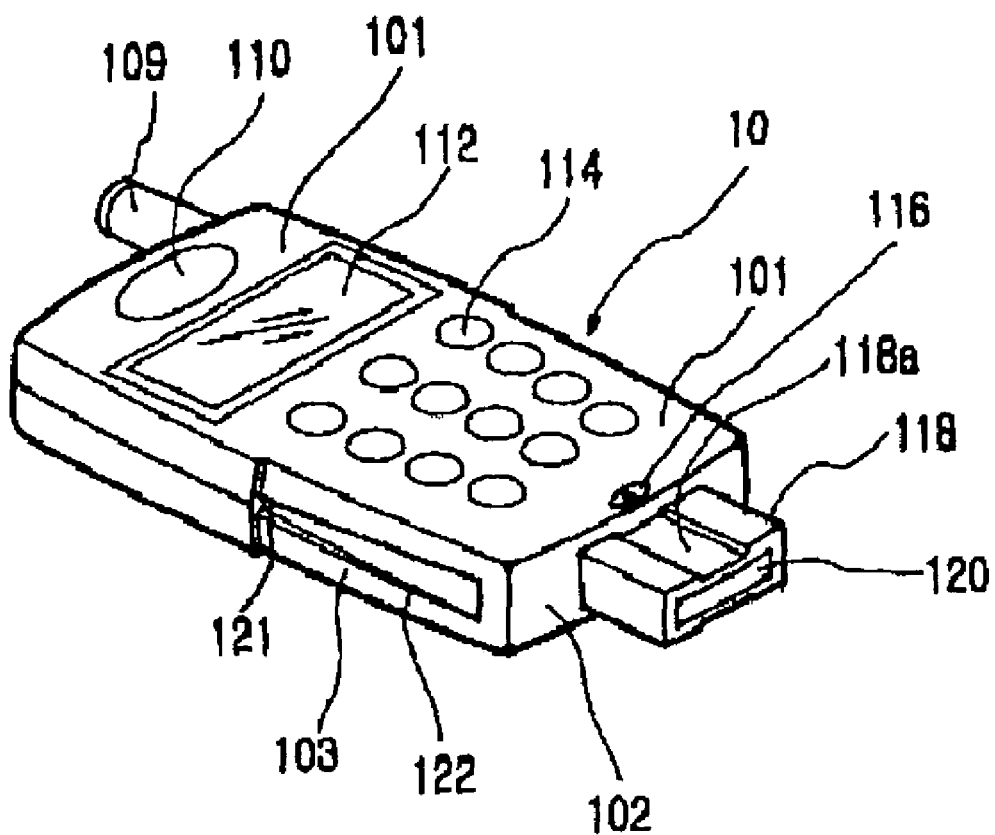
FIG. 2 is a perspective view of the mobile telephone terminal in which the bar-type replaceable sub-housing is separated from the main housing in accordance with the first preferred embodiment of the present invention.

With reference to FIGS. 1 and 2, a mobile telephone terminal comprising a main housing 10 and a bar-type replaceable sub-housing 20 in accordance with a first embodiment of the present invention is described in detail. The mobile telephone terminal as shown in FIGS. 1 and 2 comprises the main housing 10 and the bar-type replaceable sub-housing 20. The bar-type replaceable sub-housing 20 is attached to and detached from the main housing 10 in the longitudinal direction (in a direction of the arrow ①). Hereinafter, the replaceable sub-housing is referred to just as "the sub-housing". If desired by a user, the sub-housing 20 may be detached from the main housing 10 and then replaced with a different type of sub-housing. That is, the sub-housing 20 detached from the main housing 10 may be replaced with another sub-housing with a different shape or color. Herein, the sub-housing 20 may be selected from a sub-housing with a flip (as shown in FIG. 8) or a sub-housing without the flip.

Figure 8:
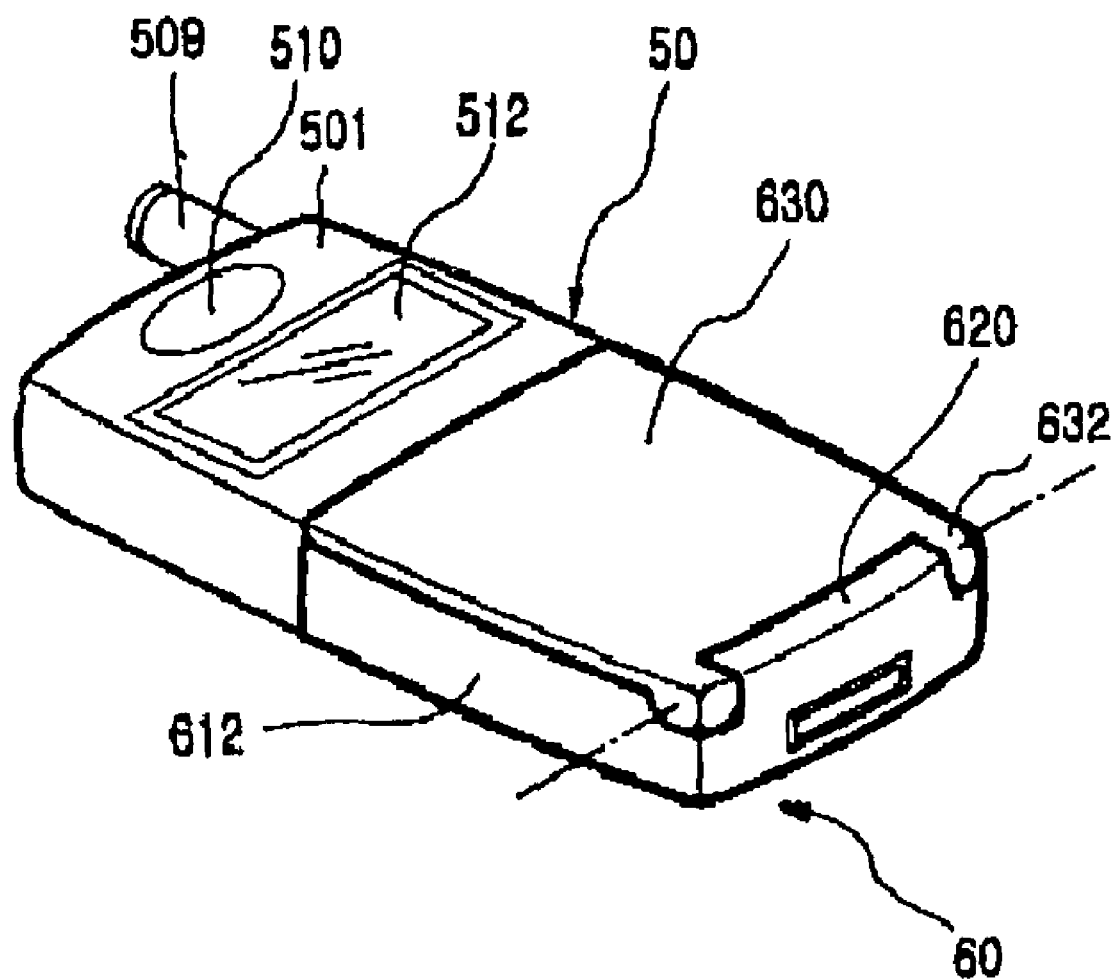
FIG. 8 is a perspective view of a mobile telephone terminal in which a flip-type replaceable sub-housing is coupled with a main housing in accordance with a third preferred embodiment of the present invention.

FIG. 1 shows a mobile telephone terminal provided with a bar-type replaceable sub-housing in accordance with a first preferred embodiment of the present invention, and FIG. 8 shows a mobile telephone terminal provided with a flip-type replaceable sub-housing in accordance with a third preferred embodiment of the present invention. As a result, the mobile telephone terminal provided with the sub-housing in accordance with the preferred embodiments of the present invention may be interchanged to a bar-type terminal or a flip-type terminal by replacing the sub-housing with another one. Further, the sub-housing used in the mobile telephone terminal of the present invention is may be formed with various colors, thereby providing variety in color and increasing users' interest.

As shown in FIGS. 1 and 2, the main housing 10 comprises an antenna unit 109, a speaker unit 110, a LCD (Liquid Crystal Display) module 112, a key array including a plurality of keys 114, and a microphone unit 116. Herein, the antenna unit 109, the speaker unit 110, the LCD module 112, the key array including a plurality of the keys 114, and the microphone unit 116 are successively formed on a front surface 101 of the main housing 10, from the top downward. In order to be attached to and detached from the main housing 10, the sub-housing 20 comprises a front end 210, a first wing 212, and a second wing 214; and an accommodation area S (shown in FIG. 3) is also provided. The first and second wings 212 and 214 are extended from both side surfaces of the front end 210. The accommodation area S is disposed between the frond end 210 and the first and second wings 212 and 214.

Figure 3:
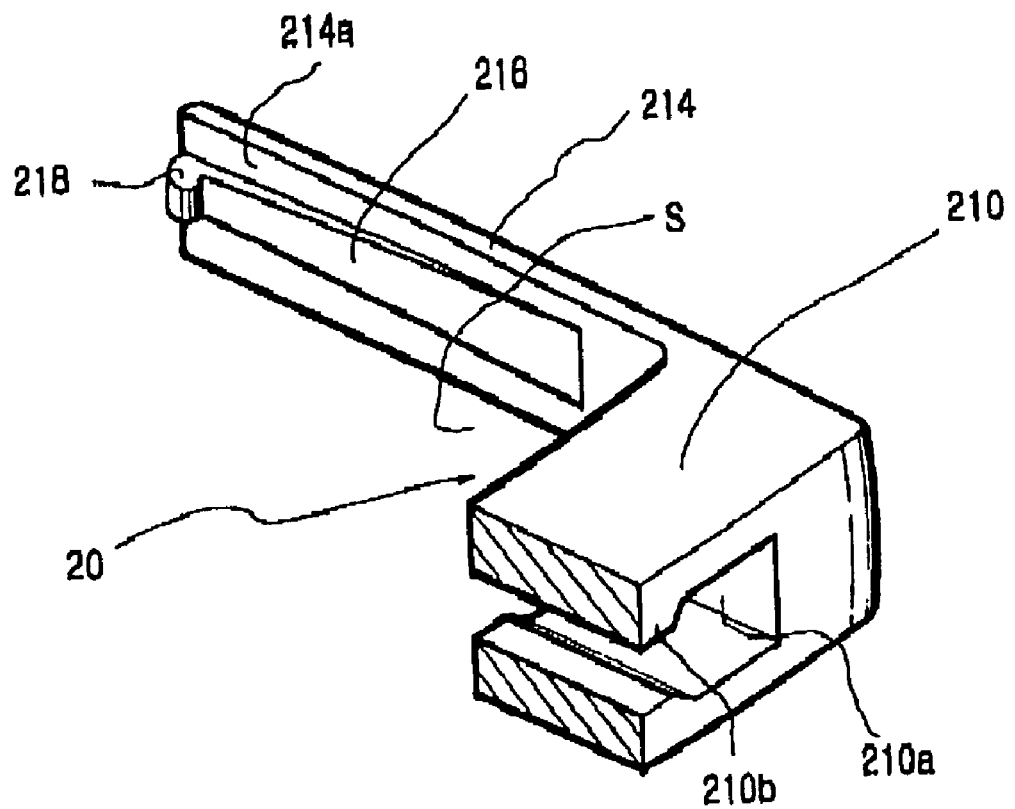
FIG. 3 is a cut-away perspective view of the bar-type replaceable sub-housing in accordance with the first preferred embodiment of the present invention.

The main housing 10 comprises a front end 102, side ends 103 (one of which is shown in FIG. 3), and a protrusion 118. The side ends 103 are formed on both side surfaces of the front end 102. The protrusion 118 is extended from the front end 102 in the longitudinal direction. The protrusion 118 includes an interface connector 120 and a recess 118a formed on a designated area of one side surface of the protrusion 118. The recess 118a is extended along the longitudinal direction of the protrusion 118 and has a designated depth. The protrusion 118 serves to firmly couple the sub-housing 20 with the main housing 10 and to guide the sub-housing 20 in the longitudinal direction. Each side end 103 has a guide groove 122 and will be coupled with a guide protrusion of the first and second wings 212 and 214. Nearer to the LCD 112 of the main housing 10, the width of the guide groove 122 decreases and the depth of the guide groove 122 increases, and nearer to the front end 102 of the main housing 10, the width of the guide groove 122 increases and the depth of the guide groove 122 decreases. That is, the guide groove 122 is in a tapered form. A connection groove 121 in a semi-cylindrical shape is formed on the tapered end of the guide groove 122.

Figure 4:
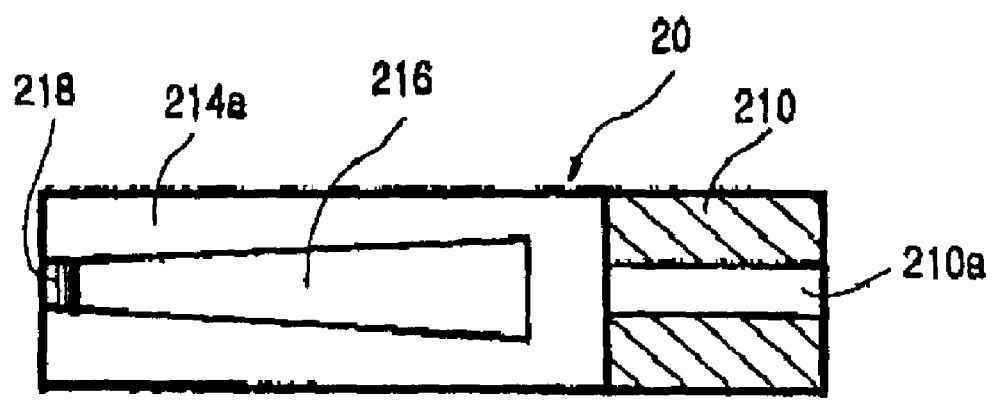
FIG. 4 is a side cut-away view of the bar-type replaceable sub-housing shown in FIG. 3.

Since the first and second wings 212 and 214 are symmetrically extended from the front end 210 in the longitudinal direction, they have the same configuration. Therefore, only the second wing 214 as shown in FIGS. 3 and 4 is described as an example, and detailed description of the first wing 212 having the same configuration as the second wing 214 is omitted.

The front end 210 of the sub-housing 20 includes at least one opening 210*a*. The opening 210*a* of the front end 210 is coupled with the protrusion 118 of the main housing 10. A guide protrusion 210*b* is formed on the upper and lower surfaces of the opening 210*a*. The guide protrusion 210*b* of the upper surface of the opening 210*a* is correspondingly opposite to the guide protrusion 210*b* of the lower surface of the opening 210*a*. As described above, the sub-housing 20 comprises the accommodation area S for accommodating the protrusion 118 of the main housing 10 between the front end 210 and the first and second wings 212 and 214. Specifically, the accommodation area S is a slot.

The second wing 214 includes a guide protrusion 216 and a connection protrusion 218. The guide protrusion 216 is formed on an inner wall 214*a* of the second wing 214 and the connection protrusion 218 is formed on one end of the guide protrusion 216. The guide protrusion 216 and the connection protrusion 218 serve to guide the second wing 214 along the main housing 10 in the longitudinal direction. The guide protrusion 216 protrudes toward the accommodation area S, and the connection protrusion 218 also protrudes toward the accommodation area S. Of course, the connection protrusion 218 is formed as a semi-cylindrical form so as to be easily slid into the main housing 10 and to be easily attached to and detached from the main housing 10. Nearer the connection protrusion 218, the width of the guide protrusion 216 decreases and the thickness of the guide protrusion 216 increases, and nearer the front end 210, the width of the guide protrusion 216 increases and the thickness of the guide protrusion 216 decreases. That is, the guide protrusion 216 is in a tapered form. This tapered form of the guide protrusion 216 allows the sub-housing 20 to be easily guided and slid into the main housing 10 in the longitudinal direction.

Since the sub-housing 20 is made of plastic material, the first and second wings 212 and 214 of the sub-housing 20 have flexibility. The first and second wings 212 and 214 have elasticity in opposite directions to each other. Therefore, when the sub-housing 20 is coupled with the main housing 10, the guide protrusions 216 of the first and second wings 212 and 214 are closely adhered to the guide grooves 122 of the main housing 10.

When the sub-housing 20 is slid and guided into the main housing 10, the guide protrusion 216 of the sub-housing 20 is slid along the guide groove 122 of the main housing 10, and the connection protrusion 218 of the sub-housing 20 is inserted and locked in the connection groove 121 of the main housing 10.

Figure 5:
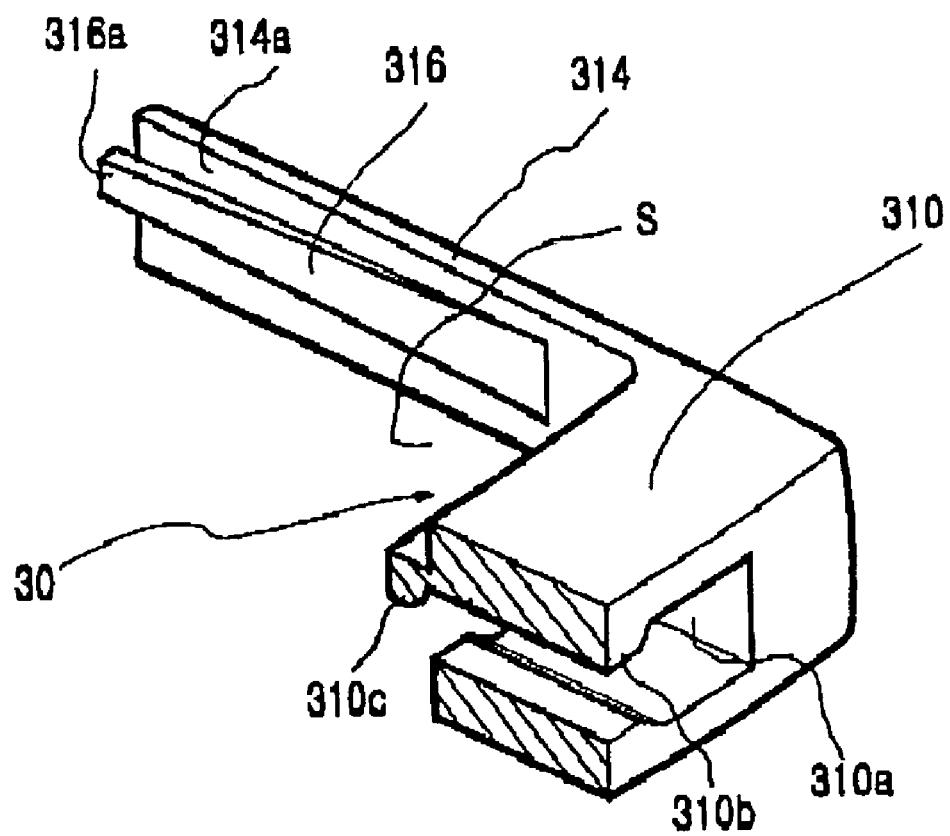
FIG. 5 is a cut-away perspective view of the bar-type replaceable sub-housing in accordance with a second preferred embodiment of the present invention.
Figure 6:
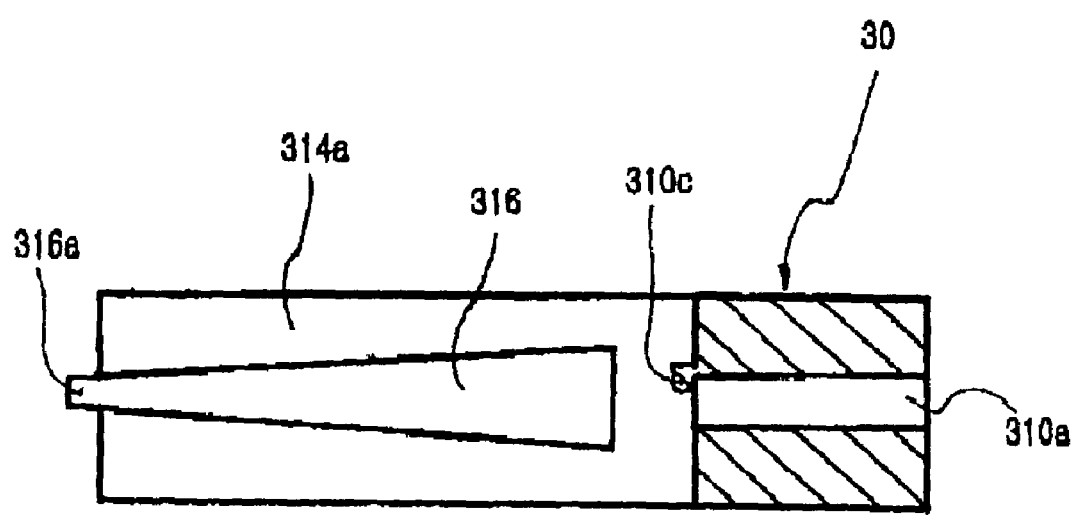
FIG. 6 is a side cut-away view of the bar-type replaceable sub-housing in FIG. 5.

FIGS. 5 and 6 show a bar-type replaceable sub-housing 30 in accordance with a second preferred embodiment of the present invention. Since the sub-housing 30 of FIGS. 5 and 6 comprises the same components as the sub-housing 20 of FIGS. 3 and 4 except for a locker 310*c* of the sub-housing 30 and related components, the detailed descriptions of the components of the sub-housing 30 are omitted.

The sub-housing 30 comprises a front end 310, a first wing (not shown), and a second wing 314. Since the first wing (not shown) and the second wing 314 are symmetrical to each other around the front end 310, they have the same configuration. Therefore, only the second wing 314 is described in detail. The second wing 314 comprises a guide protrusion 316 and the locker 310*c*. The guide protrusion 316 protrudes from an inner wall 314*a* of the second wing 314, and the locker 310*c* is extended from a protrusion 310*b* of an opening 310*a* toward the accommodation area S. The width of the guide protrusion 316 decreases and the thickness of the guide protrusion 316 increases away from the front end 310, and nearer the front end 310 of the sub-housing 310, the width of the guide protrusion 316 increases and the thickness of the guide protrusion 316 decreases. That is, the guide protrusion 316 of the second wing 314 is in a tapered form. Further, the second wing 314 includes another protrusion 316*a*. When the sub-housing 30 is coupled with the main housing 40, the protrusion 316*a* is inserted into a holding opening 421 (shown in FIG. 7), thereby firmly fixing the coupling of the sub-housing 30 and the main housing 40.

Figure 7:
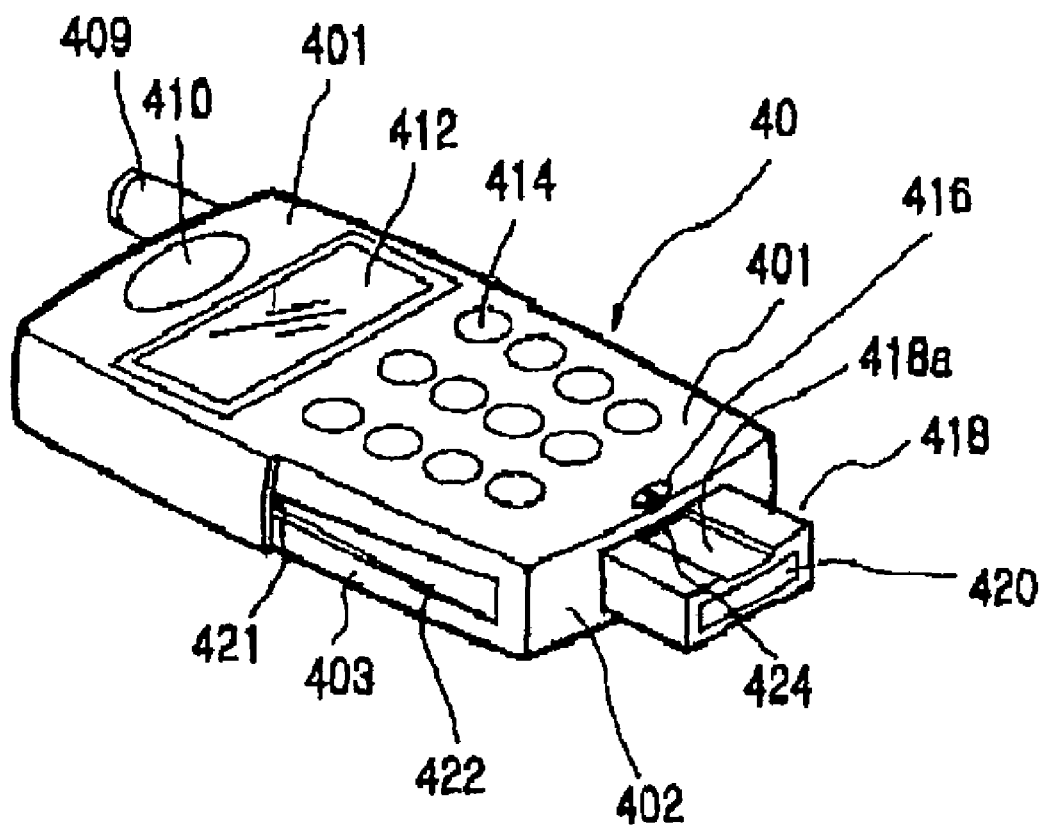
FIG. 7 is a perspective view of a main housing of a mobile telephone terminal to which the bar-type replaceable sub-housing will be attached in accordance with the second preferred embodiment of the present invention.

As shown in FIG. 7, the main housing 40, which the sub-housing 30 of the second embodiment of the present invention is attached to and detached from, includes an antenna unit 409, a speaker unit 410, a LCD 412, a key array including a plurality of keys 414, and a microphone unit 416 formed on a front surface 401 of the main housing 40. The main housing 40 comprises a front end 402, side ends 403, and a protrusion 418. The side ends 403 are formed on both side surfaces of the main housing 40. The protrusion 418 is extended from the front end 402 in the longitudinal direction. The protrusion 418 includes an interface connector 420 and a recess 418*a* formed on a designated area of one side surface of the protrusion 418. The recess 418*a* is extended along the longitudinal direction of the protrusion 418 and has a designated depth.

The protrusion 418 serves to firmly fix the coupling of the sub-housing 30 with the main housing 40 and to guide the sub-housing 30 onto the main housing 40 in the longitudinal direction. Each side end 403 has a guide groove 422. The guide groove 422 serves to be coupled with the guide protrusion 316 of the first and second wings. Nearer the LCD 412 of the main housing 40, the width of the guide groove 422 decreases and the depth of the guide groove 422 increases, and nearer the front end 402 of the main housing 40, the width of the guide groove 422 increases and the depth of the guide groove 422 decreases. That is, the guide groove 422 is in a tapered form. The holding opening 421 is formed on one end of the guide groove 422. When the sub-housing 30 is coupled with the main housing 40, the protrusion 316*a* of the sub-housing 30 is inserted into the holding opening 421 of the guide groove 422.

A locking hole 424 is formed on an end of the recess 418*a* of the protrusion 418. The locker 310*c* of the sub-housing 30 is inserted into the locking hole 424. When the sub-housing 30 is coupled with the main housing 40, the locker 310*c* of the sub-housing 30 is locked in the locking hole 424.

Figure 9:
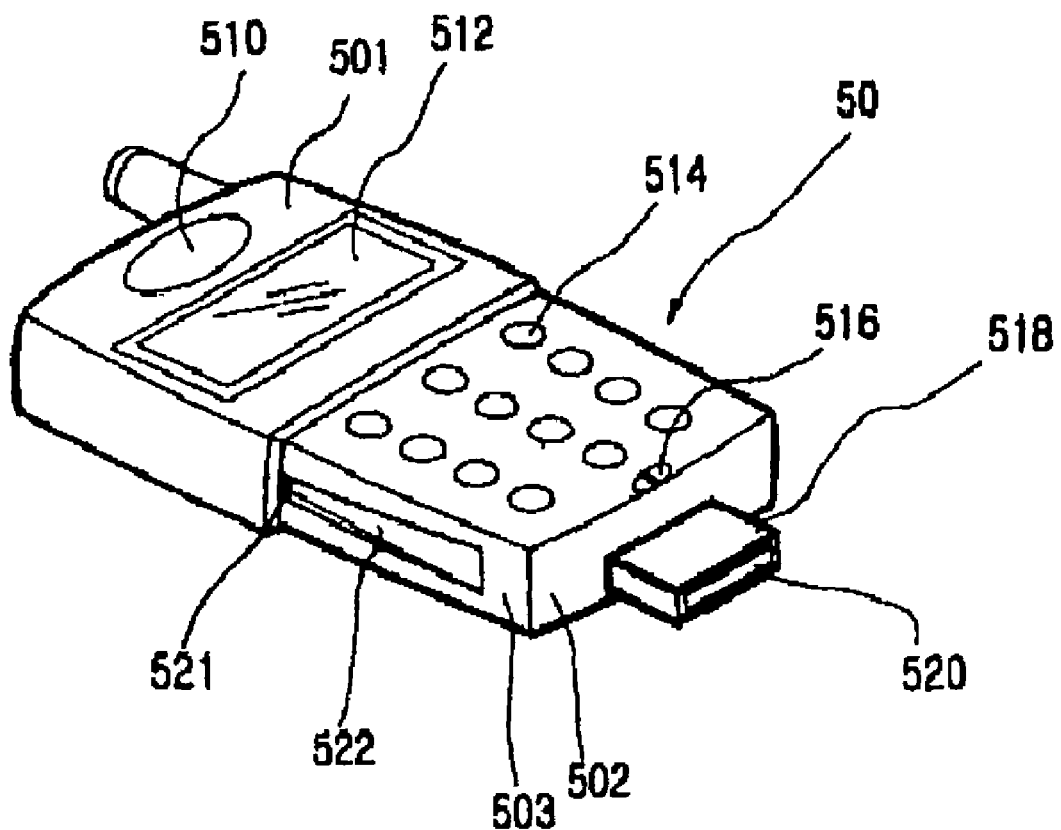
FIG. 9 is a perspective view of the mobile telephone terminal in which the flip-type replaceable sub-housing is separated from the main housing in accordance with the third preferred embodiment of the present invention.

FIG. 8 shows a mobile telephone terminal in which a flip-type replaceable sub-housing 60 is coupled with a main housing 50 in accordance with a third preferred embodiment of the present invention. FIG. 9 shows the mobile telephone terminal in which the flip-type replaceable sub-housing 60 is separated from the main housing 50 in accordance with the third preferred embodiment of the present invention. As shown in FIGS. 8 and 9, the flip-type replaceable sub-housing 60 is coupled with the main housing 50, thereby providing a flip-type mobile telephone terminal.

The sub-housing 60 is coupled with the main housing 50 to provide the flip-type mobile telephone terminal comprising a front end 610, a first wing 612, a second wing 614, a hinge housing 620, and a flip element 630. The first and second wings 612 and 614 are extended from each side surface of the front end 610. The hinge housing 620 is formed on the front end 610. The flip element 630 is connected to a hinge module (not shown) accommodated within the hinge housing 620, thereby being opened and closed. The front end 610 includes at least one opening 624 below the hinge housing 620. A protrusion 518 of the main housing 50 is inserted into the opening 624. Herein, since the flip element 630 is connected to the hinge module (not shown), which is accommodated within the hinge housing 620, the flip element 630 is formed integrally with the sub-housing 60, thereby being opened from and closed into the sub-housing 60 around a hinge axis. Therefore, when the sub-housing 60 is coupled with the main housing 50, the flip element 630 is opened from and closed into the main housing 50.

Figure 10:
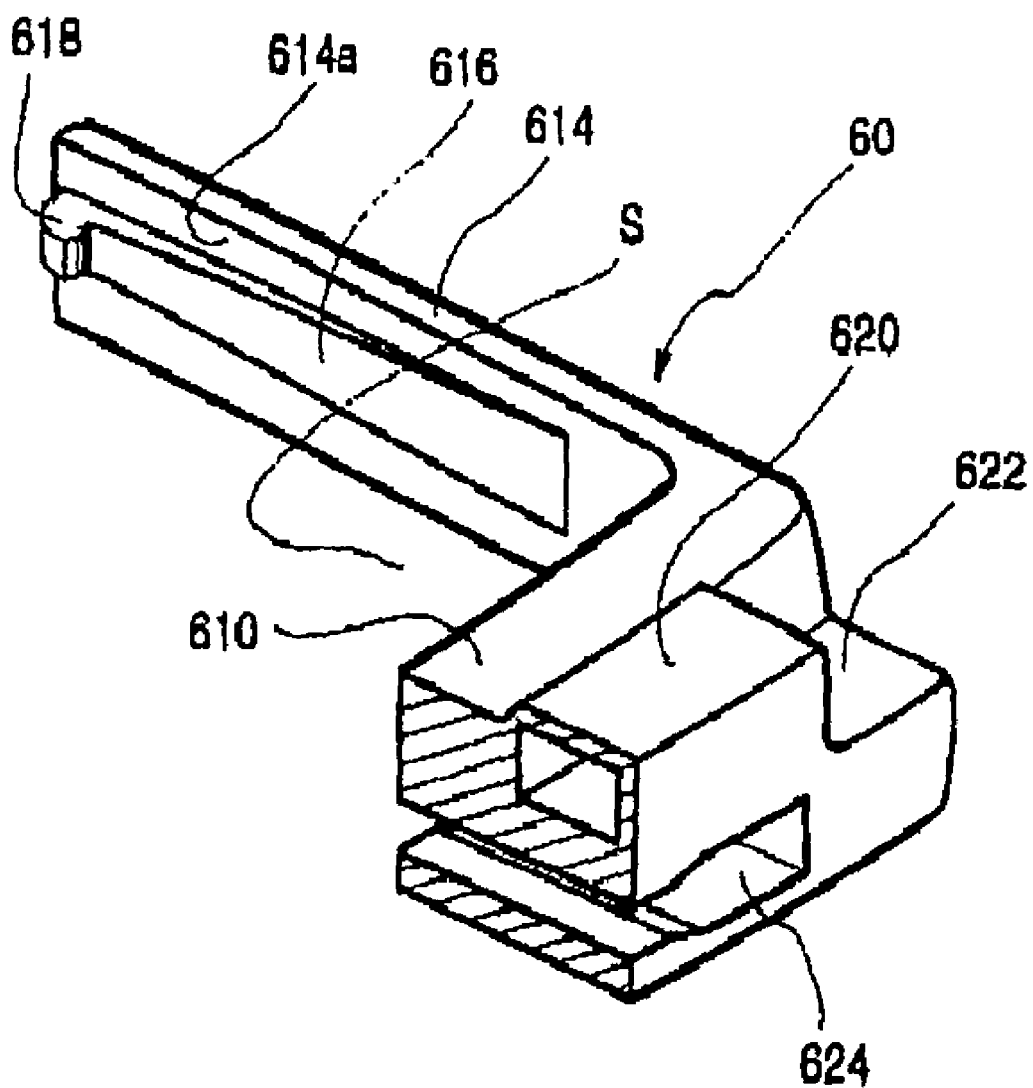
FIG. 10 is a cut-away perspective view of the flip-type replaceable sub-housing, without a flip, in accordance with the third preferred embodiment of the present invention.

As shown in FIG. 10, since the first and second wings 612 and 614 are symmetrical to each other, they have the same configuration. Therefore, only the second wing 614 as shown in FIG. 10 is described, and a detailed description of the first wing 612 having the same configuration as the second wing 614 is omitted. The second wing 614 is extended from the front end 610 and includes a guide protrusion 616 formed on its inner wall 614a. The width of the guide protrusion 616 decreases and the thickness of the guide protrusion 616 increases away from the front end 610 of the sub-housing 60, and nearer the front end 610 of the sub-housing 60, the width of the guide protrusion 616 increases and the thickness of the guide protrusion 616 decreases. The hinge housing 620 accommodates the hinge module (not shown). Hinge slots 622 are formed on both sides of the hinge housing 620. Hinge arms 632 are connected to the hinge module (not shown) by the hinge slots 622, thereby opening and closing the hinge arms 632 from and into the hinge housing 620 around the hinge axis.

A connection protrusion 618 is formed on the guide protrusion 616. The connection protrusion 618 protrudes toward the accommodation area S for coupling with a designated area, preferably the connection protrusion 618 is inserted into a connection groove 521 of the guide groove of the main housing 50, thereby coupling the sub-housing 60 with the main housing 50.

An antenna unit 509, a speaker unit 510, a LCD 512, a key array including a plurality of keys 514, and a microphone unit 516 are formed on a front surface 501 of the main housing 50 to be coupled with the flip-type replaceable sub-housing 60. The main housing 50 comprises a front end 502, side ends 503, and a protrusion 518. The side ends 503 are formed on both side surfaces of the main housing 50. The protrusion 518 with an interface connector 520 is extended from the frond end 502 in the longitudinal direction. Each side end 503 has a guide groove 522 to be coupled with the guide protrusion 616 of the first and second wings 612 and 614. Nearer the LCD 512 of the main housing 50, the width of the guide groove 522 decreases and the depth of the guide groove 522 increases, and nearer the front end 502 of the main housing 50 the width of the guide groove 522 increases and the depth of the guide groove 522 decreases. That is, the guide groove 522 is in a tapered form.

Figure 11:
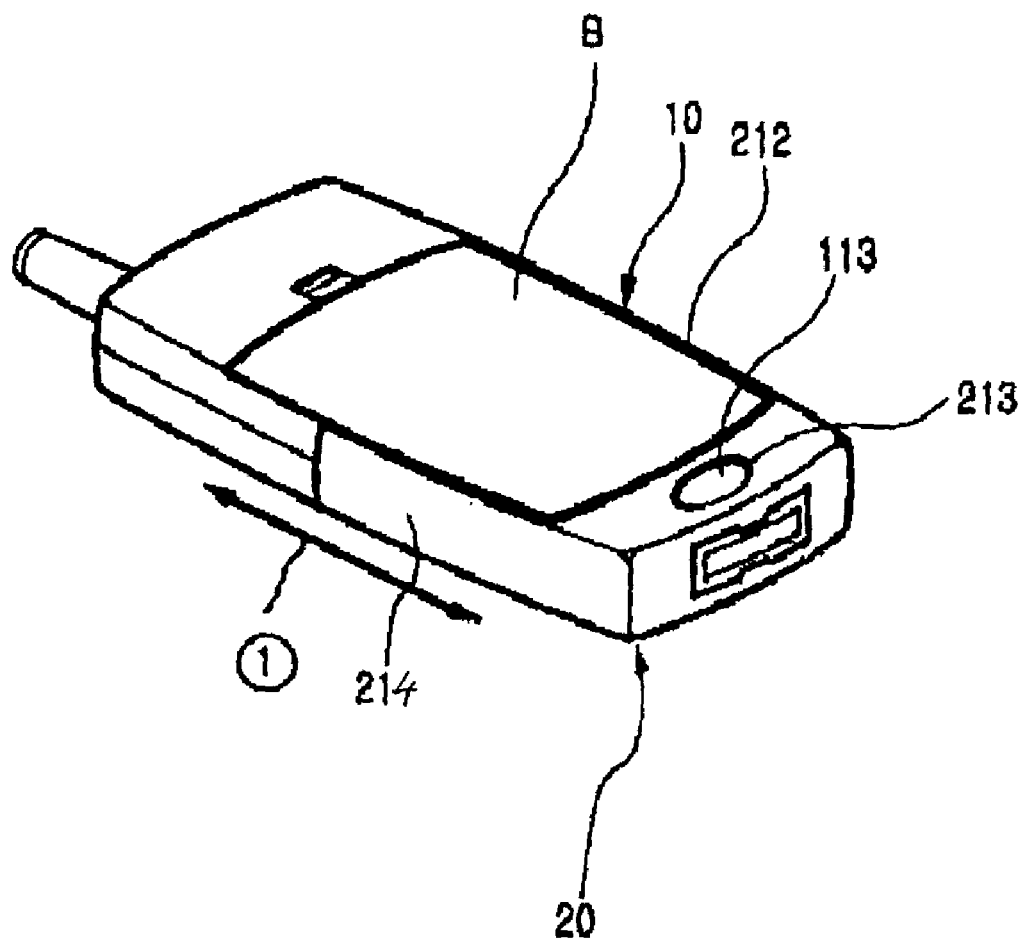
FIG. 11 is a perspective view of a locking means arranged on a back of the mobile telephone in accordance with another embodiment of the present invention.
Figure 12:
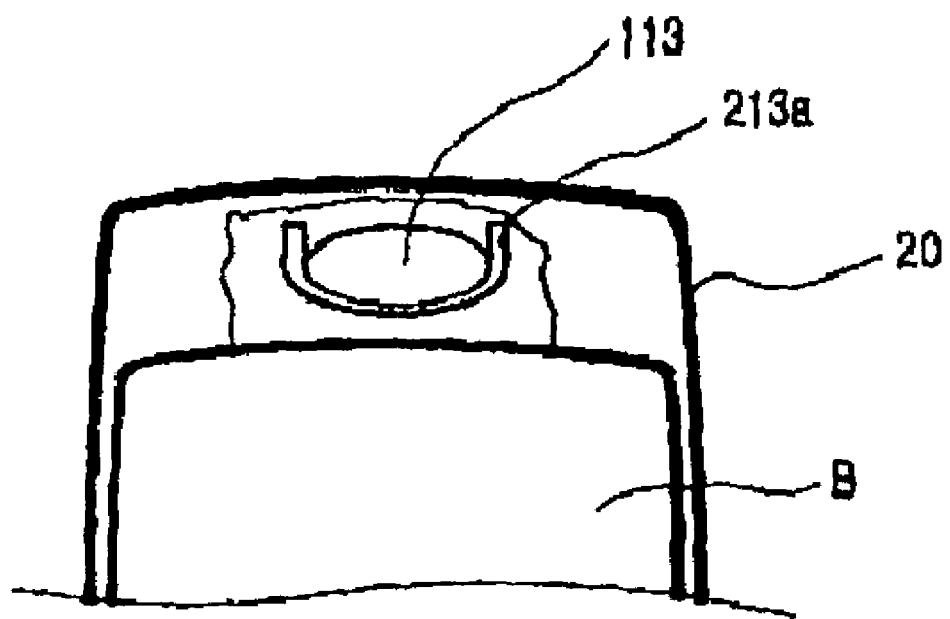
FIG. 12 is a cut-away plan view of the locking means of FIG. 11.

FIG. 11 is a perspective view of a locking means arranged on a back of the mobile telephone in accordance with another embodiment of the present invention, and FIG. 12 is a cut-away plan view of the locking means of FIG. 11

FIGS. 11 and 12 show the locking means comprising a locking elastic protrusion 113 arranged on the back of the main housing 10 of the mobile telephone terminal and a locking opening 213 in a back of the sub-housing 20 adjacent to the locking elastic protrusion 113. The locking means is for fixing the sub-housing 20 to the main housing 10. The locking opening 213 is located at a predetermined position on the sub-housing 20, i.e., on the back, and is for coupling with the locking elastic protrusion 113. The locking elastic protrusion 113 preferably has elasticity that conforms to an elastic opening 213a in the sub-housing 20, which at least partially surrounds the locking elastic protrusion 113. A reference B denotes a battery pack. One of skill in the art will recognize that, though sub-housing 20 is used as an example in FIGS. 11 and 12, the locking means may also be used with the bar-type replaceable sub-housing 30 or the flip-type replaceable sub-housing 60.

Consequently, the mobile telephone terminal of the present invention may be used both as a bar-type mobile telephone terminal by employing a bar-type sub-housing and a flip-type mobile telephone terminal by employing a flip-type sub-housing.

As apparent from the above description, the mobile telephone terminal of the present invention may be used both as a bar-type mobile telephone terminal by employing a bar-type sub-housing and as a flip-type mobile telephone terminal by employing a flip-type sub-housing, thereby solving a conventional problem of causing the user to become bored with the same type of mobile telephone terminal for a long time. That is, the replaceable sub-housing of the present invention provides variety in its design and color, thereby satisfying various consumers' tastes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile telephone terminal provided with a main housing having an antenna unit, a speaker unit, a LCD, a key array including a plurality of keys, and a microphone unit, said mobile telephone terminal comprising:
   (a) the main housing including a front end and at least one side end; and
   (b) a replaceable sub-housing including:
   a front end;
   a first wing and a second wing extended from both side surfaces of the front end in a longitudinal direction; and
   an accommodation area disposed between the front end of the replaceable sub-housing and the first and second wings,
   wherein the replaceable sub-housing surrounds a designated area of the main housing and is attached to and detached from the main housing in the longitudinal direction,
   wherein the main housing further includes a protrusion extended from the front end thereof in the longitudinal direction and the protrusion includes an interface connector, for coupling with the replaceable sub-housing,
   wherein the main housing further includes a guide groove on the side ends and a holding opening on the guide groove, and
   wherein the guide groove is tapered, and nearer the front end of the main housing the width of the guide groove increases and the depth of the guide groove decreases, and away from the front end of the main housing the width of the guide groove decreases and the depth of the guide groove increases.

2. The mobile telephone terminal as set forth in claim 1, wherein the replaceable sub-housing further includes a hinge housing formed on the front end of the replaceable sub-housing and a flip element connected to the hinge housing so as to be opened from and closed into the main housing.

3. The mobile telephone terminal as set forth in claim 1, wherein the first and second wings each include a protrusion on an end of a guide protrusion.

4. The mobile telephone terminal as set forth in claim 1, wherein the first wing includes a first guide protrusion in a tapered form and the second wing includes a second guide protrusion in a tapered form, and the first and second guide protrusions are opposite to each other.

5. The mobile telephone terminal as set forth in claim 4, wherein, away from the front end, the width of the first and second guide protrusions decreases and the thickness of the first and second guide protrusions increases, and, nearer the front end, the width of the first and second guide protrusions increases and the thickness of the first and second guide protrusions decreases.

6. The mobile telephone terminal as set forth in claim 1, wherein the front end of the replaceable sub-housing includes a locker extended toward the accommodation area and the main housing further includes a locking hole for receiving the locker therein.

7. The mobile telephone terminal as set forth in claim 1, wherein the front end of the replaceable sub-housing includes at least one opening so as to guide and hold the sub-housing when the sub-housing is coupled with the main housing.

8. The mobile telephone terminal as set forth in claim 1, wherein the main housing further comprises a locking means for fixing the replaceable sub-housing on the main housing.

9. The mobile telephone terminal as set forth in claim 8, wherein the locking means comprises:
   a locking elastic protrusion located on a back of the main housing;
   a locking opening located in a back of the replaceable sub-housing for coupling with the locking elastic protrusion.

10. The mobile telephone terminal as set forth in claim 9, wherein the locking elastic protrusion is at least partially surrounded by an elastic opening in the replaceable sub-housing.

11. A replaceable sub-housing attached to and detached from a main housing of a mobile telephone terminal in the longitudinal direction, said replaceable sub-housing comprising:
   (a) a front end including at least one opening extended in the longitudinal direction, wherein a protrusion of the main housing is inserted into the at least one opening;
   (b) a first wing and a second wing extended from both side surfaces of the front end in the longitudinal direction;
   (c) an accommodation area disposed between the front end and the first and second wings, and for attaching to the main housing;
   (d) a first guide protrusion and a second guide protrusion extended individually from inner walls of the first and second wings; and
   (e) a connection protrusion formed on each of the first and second wings and coupled with a designated area of the main housing,
   wherein, nearer the front end, the width of the first and second guide protrusions increases and the thickness of the first and second guide protrusions decreases, and, away from the front end, the width of the first and second guide protrusions decreases and the thickness of the first and second guide protrusions increases.

12. The replaceable sub-housing as set forth in claim 11, wherein the designated area of the main housing is a connection groove.

13. A replaceable sub-housing attached to and detached from a main housing of a mobile telephone terminal in the longitudinal direction, said replaceable sub-housing comprising:
   (a) a front end including at least one opening extended in the longitudinal direction, wherein a protrusion of the main housing is inserted into the opening;
   (b) a hinge housing formed on the front end;
   (c) a flip element with both ends connected to the hinge housing so as to be opened from and closed into the front end;
   (d) a first wing and a second wing extended from both side surfaces of the front end in the longitudinal direction;
   (e) an accommodation area disposed between the front end and the first and second wings, and for attaching to the main housing;
   (f) a first guide protrusion and a second guide protrusion extended individually from inner walls of the first and second wings; and
   (g) a connection protrusion formed on each of the first and second wings and coupled with a designated area of the main housing,
   wherein, nearer the front end, the width of the first and second guide protrusions increases and the thickness of the first and second guide protrusions decreases, and, away from the front end, the width of the first and second guide protrusions decreases and the thicknesses of the first and second guide protrusions increases.

14. The replaceable sub-housing as set froth in claim 13, wherein the designated area of the main housing is a connection groove.

* * * * *